(12) United States Patent
Wen et al.

(10) Patent No.: US 11,395,272 B2
(45) Date of Patent: Jul. 19, 2022

(54) METHOD AND DEVICE FOR RECEIVING AND SENDING CONTROL INFORMATION

(71) Applicant: HUAWEI TECHNOLOGIES CO., LTD., Guangdong (CN)

(72) Inventors: Ronghui Wen, Beijing (CN); Yongxia Lyu, Ottawa (CA)

(73) Assignee: Huawei Technologies Co, , Ltd., Shenzhen (CN)

( * ) Notice: Subject to any disclaimer, the term of this patent is extended or adjusted under 35 U.S.C. 154(b) by 95 days.

(21) Appl. No.: 16/783,157

(22) Filed: Feb. 5, 2020

(65) Prior Publication Data
US 2020/0178248 A1 Jun. 4, 2020

Related U.S. Application Data

(63) Continuation of application No. PCT/CN2018/098687, filed on Aug. 3, 2018.

(30) Foreign Application Priority Data

Aug. 9, 2017 (CN) .......................... 201710677555.3

(51) Int. Cl.
*H04W 72/04* (2009.01)
*H04W 76/27* (2018.01)

(52) U.S. Cl.
CPC ..... *H04W 72/0413* (2013.01); *H04W 72/042* (2013.01); *H04W 76/27* (2018.02); *H04W 72/044* (2013.01)

(58) Field of Classification Search
CPC ............. H04W 72/0413; H04W 76/27; H04W 72/044; H04W 72/042; H04L 5/0091;
(Continued)

(56) References Cited

U.S. PATENT DOCUMENTS 10,038,521 B2 * 7/2018 Yang ...................... H04L 5/001
2013/0121259 A1 5/2013 Mukherjee et al.
(Continued)

FOREIGN PATENT DOCUMENTS

CN 101969685 A 2/2011
CN 102752070 A 10/2012
(Continued)

OTHER PUBLICATIONS

3GPP TS 38.212 V0.0.0 (May 2017), 3rd Generation Partnership Project; Technical Specification Group Radio Access Network; NR; Multiplexing and channel coding(Release 15), May 2017. total 10 pages.

(Continued)

*Primary Examiner* — Vinncelas Louis
(74) *Attorney, Agent, or Firm* — Leydig, Voit & Mayer, Ltd.

(57) ABSTRACT

The embodiments of this application provide a method and a device for sending and receiving control information, to flexibly adjust reliability of uplink transmission. A network device sends indication information of an uplink control channel to a terminal device. The indication information of the uplink control channel indicates at least one parameter of the following transmission parameters: a time domain length, a frequency domain length, a time domain repeat count, a frequency domain repeat count, or a transmit diversity manner. The network device receives uplink control information from the terminal device according to the indication information by using the uplink control channel.

20 Claims, 5 Drawing Sheets

(58) Field of Classification Search
CPC ....... H04L 5/0053; H04L 1/0006; H04L 1/08; H04L 5/001
See application file for complete search history.

(56) References Cited

U.S. PATENT DOCUMENTS

| | | | |
|---|---|---|---|
| 2014/0362792 A1* | 12/2014 | Cheng | H04W 72/0413 370/329 |
| 2015/0092693 A1* | 4/2015 | Fu | H04W 72/042 370/329 |
| 2016/0128086 A1 | 5/2016 | Dinan | |
| 2017/0245265 A1 | 8/2017 | Hwang et al. | |
| 2020/0022138 A1 | 1/2020 | Cheng et al. | |
| 2020/0092872 A1* | 3/2020 | Lin | H04W 72/042 |

FOREIGN PATENT DOCUMENTS

| | | |
|---|---|---|
| CN | 103209483 A | 7/2013 |
| CN | 103916867 A | 7/2014 |
| CN | 106162888 A | 11/2016 |
| CN | 106559841 A | 4/2017 |
| EP | 3214793 A2 | 9/2017 |
| WO | 2016068542 A2 | 5/2016 |

OTHER PUBLICATIONS

3GPP TS 38.331 V0.0.4 (Jun. 2017), 3rd Generation Partnership Project; Technical Specification Group Radio Access Network; NR; Radio Resource Control (RRC);Protocol specification (Release 15 ), Jun. 2017. total 22 pages.
CATT: "Short PUCCH structure",3GPP DRAFT; R1-1700199,Jan. 16, 2017 (Jan. 16, 2017), XP051207739,total 5 pages.
Intel Corporation: "Configurations of various long PUCCH lengths",3GPP DRAFT; R1-1710561,Jun. 26, 2017 (Jun. 26, 2017), XP051299768,total 4 pages.
3GPP TS 36.211,V14.3.0,:"3rd Generation Partnership Project ;Technical Specification Group Radio AccessNetwork; Evolved Universal TerrestrialRadio Access (E-UTRA); Physical channelsand modulation (Rele.a.se 1.4)",Jun. 23, 2017 (Jun. 23, 2017), pp. 8-75,XP051298991.
Samsung: "PUCCH Design for URLLC",3GPP DRAFT; R1-1710712,Jun. 26, 2017 (Jun. 26, 2017), XP051299918,total 3 pages.

* cited by examiner

METHOD AND DEVICE FOR RECEIVING AND SENDING CONTROL INFORMATION

CROSS-REFERENCE TO RELATED APPLICATIONS

This application is a continuation of International Application No. PCT/CN2018/098687, filed on Aug. 3, 2018, which claims priority to Chinese Patent Application No. 201710677555.3, filed on Aug. 9, 2017. The aforementioned patent applications are incorporated by reference in their entireties.

TECHNICAL FIELD

This application relates to the field of communications technologies, and in particular, to a method and a device for receiving control information, and a method and a device for sending control information.

BACKGROUND

Currently, when uplink information is sent on an uplink control channel, a format of the uplink control channel is determined based on content of the uplink information. Different physical uplink control channel formats correspond to different reliability of uplink transmission. For example, if the uplink control channel is a physical uplink control channel (PUCCH), and if an one-bit acknowledgment (ACK) or negative-acknowledgment (NACK) is to be sent on the PUCCH, a PUCCH format 1a is used. If a channel quality indicator (CQI) is to be sent on the PUCCH, a PUCCH format 1 is used.

However, even for same uplink information, there may be different reliability requirements on the uplink transmission in different coverage scenarios. For example, because a maximum transmit power of a terminal device is lower than that of a base station, issues such as power consumption need to be further considered. In this case, a terminal device with a relatively poor channel condition or a terminal device located at an edge of a cell has a limited transmit power. As a result, an uplink transmission distance of the terminal device located at the edge of the cell may be shorter than a transmission distance of the base station, which means uplink coverage is limited. When same uplink information is sent, for the terminal device in the scenario of limited uplink coverage, actual reliability of an entire transmission process can be ensured as much as possible by appropriately lowering reliability of uplink transmission and improving reliability of downlink transmission, and this can also reduce the reliability requirement on an uplink control channel. For a terminal device located at the center of the cell, there is probably no limitation on the uplink coverage, and then the unlink transmission may be performed based on corresponding reliability of the uplink information.

It can be learned from the foregoing description that, currently a format of an uplink control channel is determined based on content of uplink information, and the format of the uplink control channel cannot be adjusted based on different scenarios, that is, reliability of uplink transmission cannot be adjusted based on different scenarios.

SUMMARY

Embodiments of this application provide a method and a device for receiving and transmitting control information. Therefore, flexibly adjusting reliability of uplink transmission can be achieved.

According to a first aspect, a method for receiving control information is provided. The method may be performed by a network device. The network device is, for example, a base station. The method includes sending, by the network device, indication information of an uplink control channel to a terminal device. The indication information of the uplink control channel indicates at least one of the following transmission parameters: a time domain length parameter, a frequency domain length parameter, a time domain repeat count parameter, a frequency domain repeat count parameter, and a transmit diversity manner parameter. The method further includes receiving, by the network device, uplink control information from the terminal device according to the indication information by using the uplink control channel.

According to a second aspect, a method for sending control information is provided. The method may be performed by a terminal device. The method includes: receiving, by a terminal device, indication information of an uplink control channel from a network device, where the indication information of the uplink control channel indicates at least one parameter of the following transmission parameters: a time domain length parameter, a frequency domain length parameter, a time domain repeat count parameter, a frequency domain repeat count parameter, and a transmit diversity manner parameter; and sending, by the terminal device, uplink control information to the network device according to the indication information by using the uplink control channel.

In the embodiments of this application, the network device sends the indication information of the uplink control channel to the terminal device. The indication information may indicate the at least one parameter. In this case, the uplink control channel can be adjusted by adjusting one or more of the at least one parameter, so that the network device can flexibly adjust the uplink control channel based on different coverage scenarios, thereby adjusting reliability of transmission to make uplink transmission better satisfy a requirement of a scenario.

In a possible design, the indication information includes first-format information of the uplink control channel, and the first-format information includes the at least one parameter.

In this case, the network device directly indicates specific first-format information to the terminal device, so that the terminal device can directly determine the uplink control channel based on the first-format information. The manner is relatively simple.

In a possible design, before the network device sends the indication information of the uplink control channel to the terminal device, the network device further sends RRC signaling or an MCE to the terminal device. The RRC signaling or the MCE includes a plurality of pieces of format information. In the plurality of pieces of format information, a value of at least one parameter in one format information is different from a value of at least one parameter in another format information. Correspondingly, before the receiving, by a terminal device, indication information of an uplink control channel from a network device, the method further includes: receiving, by the terminal device, RRC signaling or an MCE from the network device. The RRC signaling or the MCE includes a plurality of pieces of format information, and in the plurality of pieces of format information, a value of at least one parameter in one format information is different from a value of at least one parameter in another format information.

To be specific, the network device may preconfigure the plurality of pieces of format information of the uplink control channel by using the at least one parameter. When an uplink control channel needs to be configured, only one of the plurality of pieces of preconfigured format information needs to be selected as format information of the uplink control channel. The manner is relatively simple. The network device may configure a plurality of pieces of format information with different reliability, so that the network device may select one piece of format information from the plurality of pieces of format information based on factors such as a current scenario and a reliability requirement of a service. For example, the network device selects first-format information from the plurality of pieces of format information based on factors such as a condition of uplink coverage and a requirement of a service. Because the first-format information is originally configured by using the at least one parameter, the first-format information can certainly indicate the at least one parameter. The first-format information selected in this manner better satisfies a requirement of a scenario, so that more effective transmission can be implemented.

In a possible design, before the network device sends the indication information of the uplink control channel to the terminal device, the network device further indicates resource information of a second format to the terminal device by using RRC signaling or an MCE. Correspondingly, before the terminal device receives the indication information of the uplink control channel from the network device, the terminal device further determines, by using RRC signaling or an MCE, resource information that is of a second format and that is indicated by the network device to the terminal device.

In a possible design, the indication information indicates the time domain repeat count parameter, a value of the time domain repeat count parameter and a location of a start time domain resource are used to determine a time domain repeat count corresponding to the second format and a corresponding time domain location. The location of the start time domain resource is obtained by using the resource information of the second format.

The network device may preconfigure the second format. The second format is then used as fixed-format information after being configured. When an uplink control channel needs to be configured, the network device may determine, based on factors such as a current scenario and a reliability requirement of a service, whether another parameter needs to be additionally configured for the uplink control channel. The another parameter herein may be a subset of the at least one parameter as described previously. If the another parameter needs to be additionally configured, the network device configures second-format information and M parameters of the at least one parameter for the uplink control channel, where M is a positive integer, and M is less than or equal to a total quantity of the at least one parameter. The M parameters herein may be parameters selected from the at least one parameter based on a situation. For example, generally, the second format may not indicate a time domain repeat count. In other words, a repeat count indicated by the second format is generally 1. Therefore, during selection of the M parameters, the time domain repeat count parameter may be selected. In this way, the network device configures the second-format information and the time domain repeat count parameter for the uplink control channel to complete configuration for the uplink control channel. The time domain repeat count parameter is configured to enable the uplink control information to be repeatedly sent in time domain, so that reliability of uplink transmission is improved and an adjustment manner is highly flexible.

In a possible design, the receiving, by the network device, uplink control information from the terminal device according to the indication information by using the uplink control channel includes: receiving, by the network device at the time domain location indicated by the time domain repeat count parameter, the uplink control information from the terminal device based on the time domain repeat count indicated by the time domain repeat count parameter. Correspondingly, the sending, by a terminal device, uplink control information to the network device according to the indication information by using the uplink control channel includes: sending, by the terminal device at the time domain location indicated by the time domain repeat count parameter, the uplink control information to the network device based on the time domain repeat count indicated by the time domain repeat count parameter.

If the network device has configured the time domain repeat count parameter for the terminal device, the terminal device sends the uplink control information based on the time domain repeat count parameter, and the network device receives the uplink control information based on the time domain repeat count parameter. The uplink control information is transmitted with relatively high reliability in this manner.

In a possible design, the indication information includes a bitmap, where the bitmap indicates the frequency domain repeat count parameter corresponding to the second format and a corresponding frequency domain location; or the indication information includes the frequency domain repeat count parameter, where the frequency domain repeat count parameter is used to determine a frequency domain repeat count corresponding to the second format and a corresponding frequency domain location, and values of the frequency domain repeat count parameter are in a one-to-one correspondence with frequency domain locations; or the indication information includes the frequency domain repeat count parameter and a location of a start frequency domain resource, where the frequency domain repeat count parameter and the location of the start frequency domain resource are used to determine a frequency domain repeat count corresponding to the second format and a corresponding frequency domain location, and the location of the start frequency domain resource is obtained by using the resource information of the second format.

If the network device preconfigures the second format, when an uplink control channel needs to be configured, the network device may determine, based on factors such as a current scenario and a reliability requirement of a service, whether another parameter needs to be additionally configured for the uplink control channel. If another parameter needs to be additionally configured, the network device configures second-format information and M parameters of the at least one parameter for the uplink control channel. The M parameters herein may be parameters selected from the at least one parameter based on a situation. For example, generally, the second format may not indicate a frequency domain repeat count. In other words, a repeat count indicated by the second format is generally 1. Therefore, during selection of the M parameters, the frequency domain repeat count parameter may be selected. The network device configures the second-format information and the frequency domain repeat count parameter for the uplink control channel to complete configuration for the uplink control channel. Different indication manners may be used for the frequency domain repeat count parameter and a corresponding frequency domain location. The network device may select any one of the indication manners based on a situation, with relatively high flexibility.

In a possible design, the receiving, by the network device, uplink control information from the terminal device according to the indication information by using the uplink control channel includes: receiving, by the network device at the frequency domain location indicated by the frequency domain repeat count parameter, the uplink control information from the terminal device based on the frequency domain repeat count indicated by the frequency domain repeat count parameter. Correspondingly, the sending, by the terminal device, uplink control information to the network device according to the indication information by using the uplink control channel includes: sending, by the terminal device at the frequency domain location indicated by the frequency domain repeat count parameter, the uplink control information to the network device based on the frequency domain repeat count indicated by the frequency domain repeat count parameter.

If the network device has configured the frequency domain repeat count parameter for the terminal device, the terminal device sends the uplink control information based on the frequency domain repeat count parameter, and the network device receives the uplink control information based on the frequency domain repeat count parameter. The uplink control information is transmitted with relatively high reliability in this manner.

In a possible design, the time domain length parameter is a quantity of time domain resources, where the time domain resource is a symbol, or a slot, or a subframe; and the frequency domain length parameter is a quantity of frequency domain resources, where the frequency domain resource is a PRB or an RBG.

The time domain length parameter and the frequency domain length parameter are explained.

In a possible design, the sending, by a network device, indication information of an uplink control channel to a terminal device includes: sending, by the network device, the indication information of the uplink control channel to the terminal device by using DCI. Correspondingly, the receiving, by a terminal device, indication information of an uplink control channel from a network device includes: receiving, by the terminal device, the indication information of the uplink control channel from the network device by using DCI.

Certainly, a manner in which the network device sends the indication information is not limited in the embodiments of this application.

According to a third aspect, a network device is provided. The network device has functions of the network device in the foregoing method designs. These functions may be implemented by hardware or may be implemented by hardware executing corresponding software. The hardware or software includes one or more units corresponding to the foregoing functions.

In a possible design, a specific structure of the network device may include a transmitter and a receiver. Optionally, the network device may further include a processor. The transmitter, the receiver, and the processor may perform corresponding functions in the method according to any one of the first aspect or the possible designs of the first aspect.

According to a fourth aspect, a terminal device is provided. The terminal device has functions of the terminal device in the foregoing method designs. These functions may be implemented by hardware or may be implemented by hardware executing corresponding software. The hardware or software includes one or more units corresponding to the foregoing functions.

In a possible design, a specific structure of the terminal device may include a transmitter and a receiver. Optionally, the terminal device may further include a processor. The transmitter, the receiver, and the processor may perform corresponding functions in the method according to any one of the second aspect or the possible designs of the second aspect.

According to a fifth aspect, a network device is provided. The network device has functions of the network device in the foregoing method designs. These functions may be implemented by hardware or may be implemented by hardware executing corresponding software. The hardware or software includes one or more units corresponding to the foregoing functions.

In a possible design, a specific structure of the network device may include a sending unit and a receiving unit. Optionally, the network device may further include a processing unit. The sending unit, the receiving unit, and the processing unit may perform corresponding functions in the method according to any one of the first aspect or the possible designs of the first aspect.

According to a sixth aspect, a terminal device is provided. The terminal device has functions of the terminal device in the foregoing method designs. These functions may be implemented by hardware or may be implemented by hardware executing corresponding software. The hardware or software includes one or more units corresponding to the foregoing functions.

In a possible design, a specific structure of the terminal device may include a sending unit and a receiving unit. Optionally, the terminal device may further include a processing unit. The sending unit, the receiving unit, and the processing unit may perform corresponding functions in the method according to any one of the second aspect or the possible designs of the second aspect.

According to a seventh aspect, a communications apparatus is provided. The communications apparatus may be the network device or a chip disposed in the network device in the foregoing method designs. The communications apparatus includes: a memory, configured to store computer executable program code; a communications interface; and a processor, where the processor is coupled to the memory and the communications interface. The program code stored in the memory includes an instruction, so that when the processor executes the instruction, the communications apparatus is enabled to perform the method performed by the network device according to any one of the first aspect or the possible designs of the first aspect.

According to an eighth aspect, a communications apparatus is provided. The communications apparatus may be the terminal device or a chip disposed in the terminal device in the foregoing method designs. The communications apparatus includes: a memory, configured to store computer executable program code; a communications interface; and a processor, where the processor is coupled to the memory and the communications interface. The program code stored in the memory includes an instruction, so that when the processor executes the instruction, the communications apparatus is enabled to perform the method performed by the terminal device according to any one of the second aspect or the possible designs of the second aspect.

According to a ninth aspect, a computer storage medium is provided. The computer readable storage medium stores an instruction, so that when the instruction is run on a computer, the computer is enabled to perform the method according to any one of the first aspect or the possible designs of the first aspect.

According to a tenth aspect, a computer storage medium is provided. The computer readable storage medium stores an instruction, so that when the instruction is run on a computer, the computer is enabled to perform the method according to any one of the second aspect or the possible designs of the second aspect.

According to an eleventh aspect, a computer program product is provided. The computer program product stores an instruction, so that when the instruction is run on a computer, the computer is enabled to perform the method according to any one of the first aspect or the possible designs of the first aspect.

According to a twelfth aspect, a computer program product is provided. The computer program product stores an instruction, so that when the instruction is run on a computer, the computer is enabled to perform the foregoing method according to any one of the second aspect or the possible designs of the second aspect.

In the embodiments of this application, the uplink control channel can be adjusted by adjusting one or more of the at least one parameter, so that the network device can flexibly adjust the uplink control channel based on different coverage scenarios, thereby adjusting reliability of transmission to make uplink transmission better satisfy a requirement of a scenario.

DESCRIPTION OF EMBODIMENTS

Figure 1:
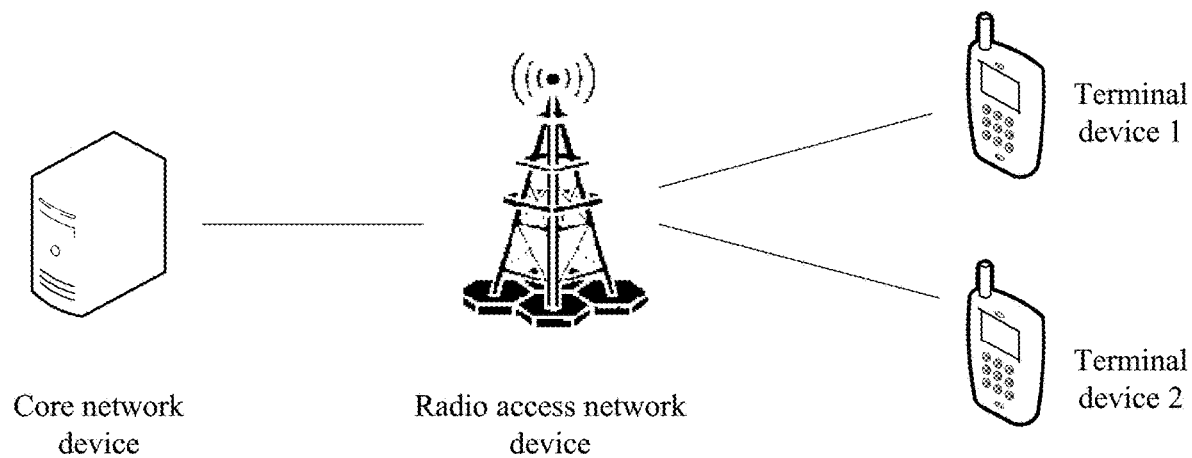
FIG. 1 is a schematic diagram of an application scenario according to an embodiment of this application.

To make the objectives, technical solutions, and advantages of the embodiments of this application clearer, the embodiments of this application are further described below in detail with reference to the accompanying drawings.

Some terms in the embodiments of this application are described below to help a better understanding of the application.

(1) Terminal Device

A terminal device is a device that provides a user with voice and/or data connectivity. For example, a terminal device may be a handheld device with a wireless connection function, or a processing device connected to a wireless modem. The terminal device may communicate with a core network through a radio access network (RAN) and exchange voice and/or data with the RAN. The terminal device may be called in different names, such as user equipment (UE), a wireless terminal, a mobile terminal, a subscriber unit, a subscriber station, a mobile station, a remote station, an access point (AP), a remote terminal, an access terminal, a user terminal, a user agent, a user device, or the like.

In actual applications, a terminal device may be a mobile phone (or referred to as a "cellular" phone), a computer having a mobile terminal device, a portable device, a pocket-sized device, a handheld device, a computer built-in or in-vehicle mobile apparatus, a smart wearable device, or the like. Some terminal devices are known as a personal communication service (PCS) phone, a cordless phone, a session initiation protocol (SIP) phone, a wireless local loop (WLL) station, a personal digital assistant (PDA), a smartwatch, a smart helmet, smart glasses, a smart band, a mobile phone, a tablet computer, a computer having a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety scheme, a wireless terminal in a smart city scheme, or a wireless terminal in a smart home scheme. The terminal device further includes a limited device, for example, a device with relatively low power consumption, a device with a limited storage capability, or a device with a limited computing capability. For example, the terminal device includes an information sensing device, such as a barcode device, a radio frequency identification (RFID) device, a sensor, a global positioning system (GPS), or a laser scanner.

(2) Network Device

A network device includes, for example, a base station (for example, an access point), and may be a device that communicates with a wireless terminal device over an air interface by using one or more cells in an access network. The base station may be configured to perform conversion between a received over-the-air frame and an internet protocol (IP) packet, and serve as a router between the terminal device and the rest of the access network, where the rest of the access network may include an IP network. The base station may also coordinate attribute management of the air interface. For example, the base station may include an evolved NodeB (eNB or e-NodeB) in a long term evolution (LTE) system or an LTE-advanced (LTE-A) system, or may include a next generation NodeB (gNB) in a fifth generation (5G) mobile communications system's new radio (NR) system. This is not limited in the embodiments of this application.

(3) Uplink Control Channel

An uplink control channel includes, for example, a physical uplink control channel (PUCCH) or an enhanced physical uplink control channel (EPUCCH), and may further include another type of uplink control channel. The uplink control channel may have different names in different communications systems.

(4) System/Network

The terms "system" and "network" may be used interchangeably in the embodiments of this application. "A plurality of" means "two or more", and in view of this, "a plurality of" may be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Unless otherwise indicated, ordinal numbers such as "first" and "second" mentioned in the embodiments of this application are used only to distinguish between a plurality of objects but are not used to limit an order, a time sequence, priorities or importance levels of the plurality of objects.

The technical solutions provided in this specification may be applied to a 5G NR system (an NR system for short below) or an LTE system, and may be further applied to a next generation mobile communications system or another similar mobile communications system.

Some concepts used in the embodiments of this application are described above. The technical background of the embodiments of this application is described below.

Mobile communications technologies have radically changed people's life. However, people never cease to strive for mobile communications technologies with higher performance. To adapt to explosive growth of mobile data traffic, massive device connections of mobile communications, and various emerging new services and application scenarios in the future, a fifth generation (5G) mobile communications system comes into being. The International Telecommunication Union (ITU) has defined three categories of application scenarios for 5G and future mobile communications systems: enhanced mobile broadband (eMBB), ultra-reliable and low latency communications (URLLC), and massive machine type communications (mMTC).

Typical eMBB services include ultra-high-definition videos, augmented reality (AR), virtual reality (VR), and the like. Main characteristics of these services are transmission of a large amount of data and a very high transmission rate. Typical URLLC services include tactile interaction applications, for example, wireless control in industrial manufacturing or production processes, motion control and remote maintenance of self-driving cars and unmanned aircrafts, and remote medical surgery. Main characteristics of these services are ultra-high reliability, low latency, transmission of a relatively small amount of data, and burstiness. Typical mMTC services include smart grid distribution automation, smart cities, and the like. Main characteristics of these services are a huge quantity of connected network devices, transmission of a relatively small amount of data, and insensitivity of data to transmission latency. These mMTC terminals need to satisfy requirements of low costs and extremely long standby duration.

URLLC services have an extremely high latency requirement. Transmission latency needs to be within 0.5 milliseconds (ms) without considering reliability. When 99.999% reliability is achieved, transmission latency needs to be within 1 ms.

In an LTE system, a minimum time scheduling unit is a transmission time interval (TTI) with a time length of 1 ms. To satisfy a transmission latency requirement of a URLLC service, a shorter time scheduling unit may be used for data transmission over a wireless air interface. For example, a mini-slot (mini-slot) or a slot with a longer subcarrier spacing is used as a minimum time scheduling unit. One mini-slot includes one or more time domain symbols. The time domain symbol herein may be an orthogonal frequency division multiplexing (OFDM) symbol. For a slot with a subcarrier spacing of 15 kilohertz (kHz), six or seven time domain symbols are included, and a corresponding time length is 0.5 ms. For a slot with a subcarrier spacing of 60 kHz, a corresponding time length is shortened to 0.125 ms.

URLLC has an extremely high reliability requirement. Such a requirement is reflected in both a data channel and a control channel. Therefore, reliability of URLLC is concatenation of reliability of a plurality of types of channels. Research shows that reliability of a plurality of types of channels may be transferred to each other and interchanged with each other. For example, a maximum transmit power of a terminal device is lower than that of a base station, and problems such as power consumption need to be further considered. In this case, a terminal device with a relatively poor channel condition or a terminal device located at an edge of a cell has a limited transmit power. As a result, an uplink transmission distance of the terminal device located at the edge of the cell may be shorter than a transmission distance of the base station, that is, uplink coverage is limited. For the terminal device in the scenario of limited uplink coverage, actual reliability of an entire transmission process can be ensured as much as possible by appropriately reducing reliability of uplink transmission and improving reliability of downlink transmission, and this can also reduce a reliability requirement on an uplink control channel.

Content included in uplink control information may be an acknowledgment result of downlink data information, reporting of channel quality measured by the terminal device, or the like. Time-frequency resources occupied by different content may have different sizes. Therefore, in an LTE system, a format of an uplink control channel is determined based on content of uplink information. For same content of uplink information, a same format of an uplink control channel is selected. For example, Table 1 shows different formats of uplink control information defined based on different content in an LTE system.

TABLE 1

| PUCCH format | Carried information | Quantity of bits in each subframe |
|---|---|---|
| 1 | Uplink scheduling request indication (scheduling request indication, SRI) | N/A |
| 1a | 1-bit (bit) ACK | 1 |
| 1b | 2-bit ACK | 2 |
| 2 | CQI | 20 |
| 2a | CQI + 1-bit ACK | 21 |
| 2b | CQI + 2-bit ACK | 22 |

It can be learned from Table 1 that, in the LTE system, a corresponding PUCCH format is determined provided that information carried by a PUCCH is determined. Different PUCCH formats correspond to different reliability of transmission. In other words, reliability of transmission is determined once information carried by a PUCCH is determined.

Therefore, in the LTE system, a format of an uplink control channel cannot be adjusted based on different scenarios, that is, reliability of uplink transmission cannot be adjusted based on different scenarios.

In view of this, technical solutions in the embodiments of this application are provided, to flexibly adjust an uplink control channel, thereby adjusting reliability of transmission.

The technical background is described as above. An application scenario in an embodiment of this application is described below. FIG. 1 is a schematic architectural diagram of a mobile communications system to which an embodiment of this application is applied.

As shown in FIG. 1, the mobile communications system includes a core network device, a radio access network device, and at least one terminal device (for example, a terminal device 1 and a terminal device 2 in FIG. 1). The terminal device is connected in a wireless manner to the radio access network device. The radio access network device is connected in a wireless or wired manner to the core network device. The core network device and the radio access network device may be different independent physical devices. Alternatively, functions of the core network device and logic functions of the radio access network device may be integrated into a same physical device. Alternatively, some functions of the core network device and some functions of the radio access network device may be integrated into one physical device. The terminal device may be stationary or movable. FIG. 1 is only a schematic diagram. The mobile communications system may further include another network device, for example, may further include a wireless relay device and a wireless backhaul device that are not shown in FIG. 1. A quantity of core network devices, a quantity of radio access network devices, and a quantity of terminal devices included in the mobile communications system are not limited in this embodiment of this application.

The radio access network device is an access device through which the terminal device is connected in a wireless manner to the mobile communications system, and may be a NodeB (NodeB), an evolved NodeB (eNodeB), a base station in a 5G mobile communications system, a base station in a future mobile communications system, an access node in a wireless fidelity (Wi-Fi) system, or the like. Specific technologies and specific device forms used for the radio access network device are not limited in this embodiment of this application.

The radio access network device and the terminal device may be deployed on land, for example, may be indoor devices or outdoor devices, handheld devices or in-vehicle devices; or may be deployed on water; or may be deployed on an airplane, a balloon or a satellite in the air. Application scenarios of the radio access network device and the terminal device are not limited in this embodiment of this application.

A licensed spectrum or an unlicensed spectrum or both may be used for communication between the radio access network device and the terminal device, and between terminal devices. A spectrum below 6 GHz or a spectrum above 6 GHz or both a spectrum below 6 GHz and a spectrum above 6 GHz may be used for communication between the radio access network device and the terminal device, and between terminal devices. A spectrum resource used between the radio access network device and the terminal device is not limited in this embodiment of this application.

The technical solutions provided in the embodiments of this application are described below with reference to the accompanying drawings.

Figure 2:
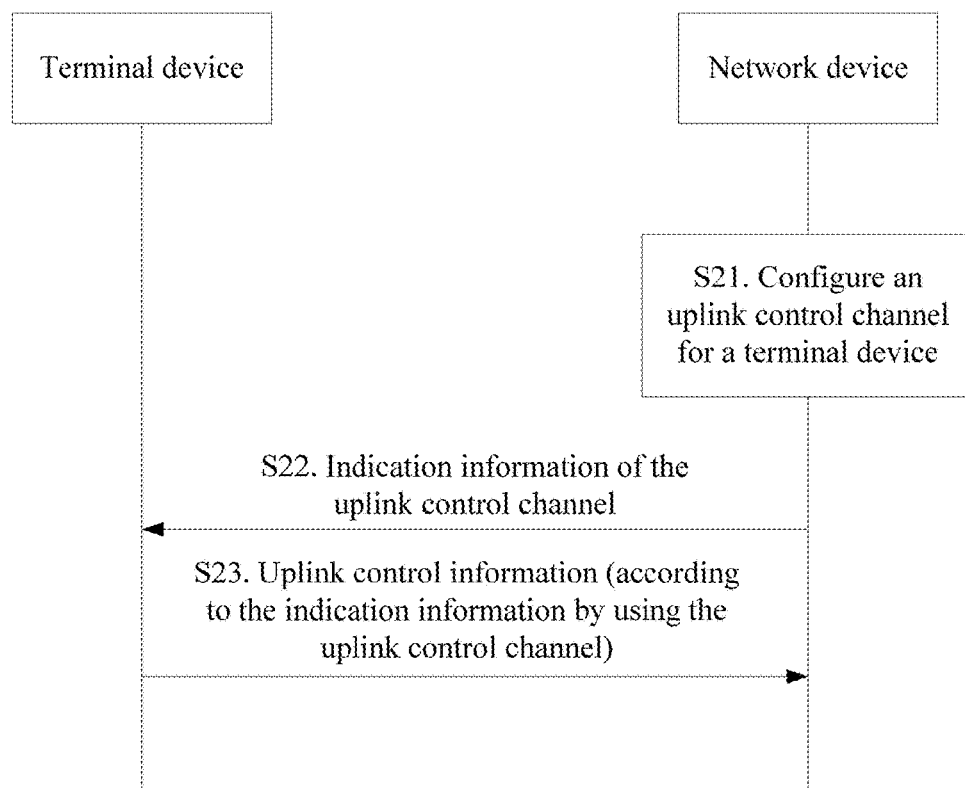
FIG. 2 is a flowchart of a method for receiving control information and sending control information according to an embodiment of this application.

As shown in FIG. 2, an embodiment of this application provides a method for receiving control information and sending control information. In the following description, for example, the method provided in this embodiment of this application is applied to the application scenario shown in FIG. 1. In this case, a network device mentioned below may be the radio access network device in the application scenario shown in FIG. 1.

S21. A network device configures an uplink control channel for a terminal device.

The network device may configure an uplink control channel for the terminal device when determining that the terminal device is to send uplink control information on the uplink control channel. Alternatively, when the terminal device temporarily does not send uplink control information, the network device may preconfigure an uplink control channel for the terminal device.

In this embodiment of this application, the network device may configure the uplink control channel in various manners. The manners are separately described below.

1. A Manner of Selecting Format Information from a Plurality of Pieces of Preconfigured Format Information In Manner 1, the network device preconfigures a plurality of pieces of format information of an uplink control channel. Each piece of format information may be configured by using at least one parameter of the following parameters: a time domain length parameter, a frequency domain length parameter, a repeat count parameter, and a transmit diversity manner parameter. The repeat count parameter may include a time domain repeat count parameter and/or a frequency domain repeat count parameter. In an optional manner, options of the at least one parameter may further include a power parameter, a time domain resource parameter, a frequency domain resource parameter, and a sequence resource parameter. To be specific, each piece of format information may be configured by using at least one parameter of the following parameters: a time domain length parameter, a frequency domain length parameter, a time domain repeat count parameter, a frequency domain repeat count parameter, a power parameter, a transmit diversity manner parameter, a time domain resource parameter, a frequency domain resource parameter, and a sequence resource parameter. In other words, format information of an uplink control channel is obtained by configuring a value of the at least one parameter. In this way, among the at least one parameter, provided that one or more parameters have different values, it is considered that correspondingly there are different pieces of format information. For example, the network device configures first-format information and second-format information. Both the first-format information and the second-format information are configured by using a time domain length parameter, a frequency domain length parameter, a repeat count parameter, and a transmit diversity manner parameter. A value of the time domain length parameter in the first-format information is 2, and a value of the time domain length parameter in the second-format information is 4. This indicates that the first-format information and the second-format information are different pieces of format information, because a value of at least one parameter is different.

The time domain length parameter is a quantity of time domain resources, where the time domain resource is a symbol, or a slot (slot), or a subframe. For example, an existing uplink control channel may support transmission of one symbol, two symbols, or four to 14 symbols. The network device configures a format of an uplink control channel for the terminal device, and a quantity of symbols occupied by the uplink control channel may be determined. From the perspective of reliability of transmission, when more symbols are occupied, reliability of transmission is generally higher. The symbol herein may be an orthogonal frequency division multiplexing (OFDM) symbol.

The frequency domain length parameter is a quantity of frequency domain resources, where the frequency domain resource is a physical resource block (PRB) or a resource block group (RBG). For example, the network device configures a format of an uplink control channel for the terminal device, and a quantity of PRBs occupied by the uplink control channel may be determined. From the perspective of reliability of transmission, when more PRBs are occupied, reliability of transmission is generally higher.

Figure 3:
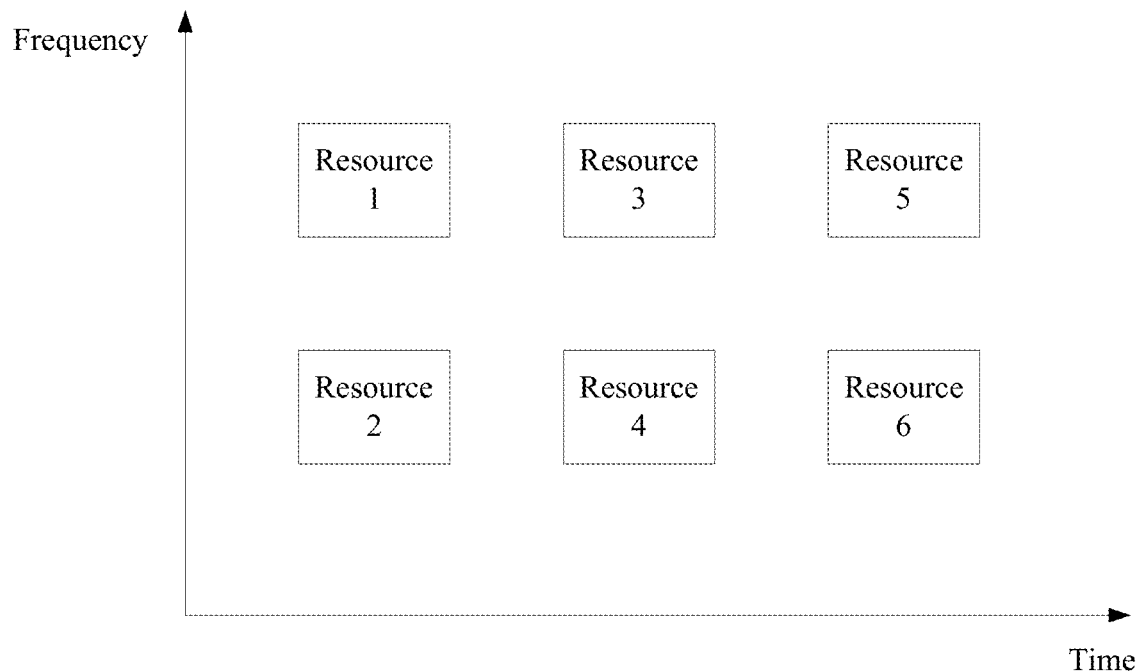
FIG. 3 is a schematic diagram of repeatedly transmitting uplink control information in time domain and in frequency domain according to an embodiment of this application.

The repeat count parameter indicates a quantity of repeated transmissions on the uplink control channel. If the repeat count parameter includes a time domain repeat count parameter, the time domain repeat count parameter indicates a quantity of repeated transmissions on the uplink control channel in time domain. If the repeat count parameter includes a frequency domain repeat count parameter, the frequency domain repeat count parameter indicates a quantity of repeated transmissions on the uplink control channel in frequency domain. The transmission on the uplink control channel herein may be understood as transmission of uplink control information by using the uplink control channel. As shown in FIG. 3, for example, one time frequency resource block is occupied each time for transmission on an uplink control channel, and format information configured for the terminal device requires six repeated transmissions. A total of six time domain resource blocks need to be occupied. The six repeated transmissions include three transmissions in time domain, that is, a value of the time domain repeat count parameter is 3. There are two transmissions in frequency domain in each time unit, that is, a value of the frequency domain repeat count parameter is 2. Time or frequency resources occupied during the repeated transmissions may be consecutive or nonconsecutive.

The transmit diversity manner parameter indicates whether a transmit diversity manner is used when the terminal device sends uplink control information on the uplink control channel. Generally, the terminal device may use a space diversity to improve reliability of uplink transmission. In other words, if uplink control information is sent in the transmit diversity manner, reliability is relatively high; or if uplink control information is sent without using the transmit diversity manner, reliability is lower than that when the transmit diversity manner is used.

The power parameter indicates an uplink transmit power used when uplink control information is sent on the uplink control channel. Generally, when the uplink transmit power is higher, reliability of transmission is higher. Therefore, for a service such as a URLLC service that has a relatively high reliability requirement, a value of a power parameter configured by the network device for the service may be relatively large. In other words, the terminal device may use a relatively high uplink transmit power for this type of services to ensure maximum reliability of transmission. For a service such as an eMBB service that does not have a very high reliability requirement, a value of a power parameter configured by the network device for the service may be relatively small. In other words, the terminal device may use a relatively low uplink transmit power for this type of services to reduce power consumption of the terminal device.

The time domain resource parameter indicates a time domain resource occupied by the uplink control channel. The frequency domain resource parameter indicates a frequency domain resource occupied by the uplink control channel. The sequence resource parameter indicates a sequence resource occupied by the uplink control channel. The network device jointly allocates a repeat count parameter, a time-frequency resource, a code domain resource, and a frequency domain resource, so that different terminal devices are orthogonal to each other.

The network device preconfigures the plurality of pieces of format information of the uplink control channel by using the at least one parameter, so that when an uplink control channel needs to be configured, it is only necessary to select one of the plurality of pieces of preconfigured format information as format information of the uplink control channel. The manner is relatively simple. The network device may configure a plurality of pieces of format information with different reliability, so that the network device may select one piece of format information from the plurality of pieces of format information based on factors such as a current scenario and a reliability requirement of a service. For example, the network device selects first-format information from the plurality of pieces of format information based on factors such as a condition of uplink coverage and a requirement of a service. Because the first-format information is originally configured by using the at least one parameter, the first-format information can certainly indicate the at least one parameter. The first-format information selected in this manner better satisfies a requirement of a scenario, so that more effective transmission can be implemented.

2. A Manner of Configuration Based on Preconfigured Format Information and M Parameters In Manner 2, the network device preconfigures format information of an uplink control channel. For example, one piece of format information of an uplink control channel is preconfigured by the network device or predefined in a protocol. The format information is referred to as second-format information. The second-format information corresponds to a second format of the uplink control channel. The predefined format is, for example, any one of some fixed formats defined in a protocol. When some fixed formats are defined in the protocol, types of uplink control information that these formats are specifically used to transmit are predefined. The second format may reuse any format in an LTE system, and is, for example, a PUCCH format 1 or a PUCCH format 1a in the LTE system. Alternatively, the second format may be a format configured by the network device based on the at least one parameter described previously in this embodiment of this application. In this case, the network device configures one format as the second format based on the at least one parameter.

The second format is then used as a fixed format after being configured. When an uplink control channel needs to be configured, the network device may determine, based on factors such as a current scenario and a reliability requirement of a service, whether another parameter needs to be additionally configured for the uplink control channel. The another parameter herein may be a subset of the at least one parameter as described previously. If the another parameter needs to be additionally configured, the network device configures the second format and M parameters of the at least one parameter for the uplink control channel, where M is a positive integer, and M is less than or equal to a total quantity of the at least one parameter. The M parameters herein may be parameters selected from the at least one parameter based on a situation. Which parameter or parameters are selected from the at least one parameter as the M parameters are not limited in this embodiment of this application. For example, generally the second format may not indicate a time domain repeat count or a frequency domain repeat count. In other words, a repeat count indicated by the second format is generally 1. Therefore, during selection of the M parameters, the time domain repeat count parameter may be selected, or the frequency domain repeat count parameter may be selected, or both the time domain repeat count parameter and the frequency domain repeat count parameter may be selected. In this way, network device configures the second format and the M parameters for the uplink control channel to complete configuration for the uplink control channel.

Figure 5:
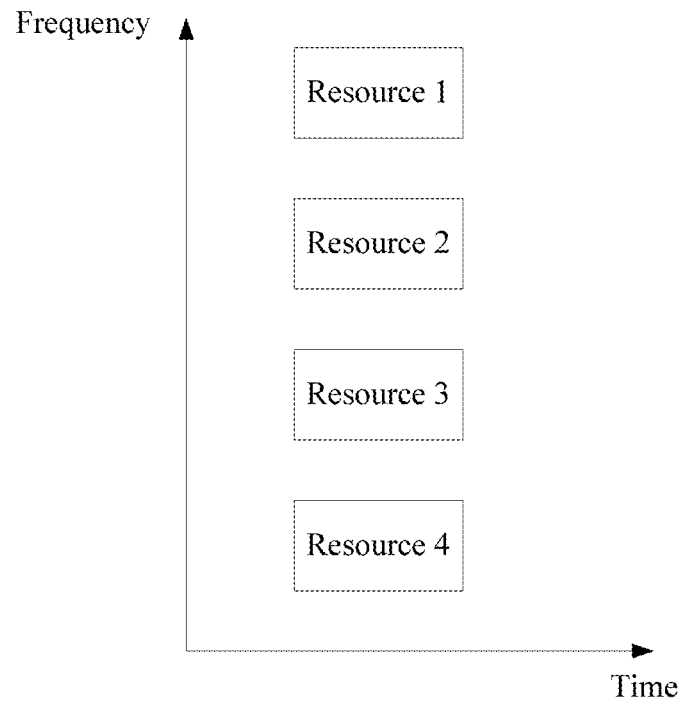
FIG. 5 is a schematic diagram of resources preconfigured by a network device for a terminal device.

Generally, the network device configures, for the terminal device in advance, a plurality of resources used to transmit uplink control information. As shown in FIG. 5, within a same time unit, the network device configures four resource blocks, namely, a resource 1 to a resource 4, of different frequency resources for the terminal device. The terminal device may be notified of the configured resources in advance by using higher layer signaling. When the terminal device needs to send uplink control information, for example, when the network device triggers or instructs the terminal device to send uplink control information, the network device determines, for the terminal device, a resource used for sending the uplink control information. In this case, in this embodiment of this application, the network device performs configuration as much as possible to send an uplink control information on these resources to utilize an allocated resource as much as possible to improve resource utilization.

In addition, if the parameter configured by the network device includes a frequency domain repeat count parameter, the network device may perform configuration as much as possible to repeatedly send an uplink control information on an allocated resource. A specific configured repeat count may be determined by the network device based on factors such as quality of an uplink control channel of the terminal device and a reliability requirement reported by the terminal device. For example, if the terminal device has a relatively low reliability requirement, the network device may perform configuration so that the terminal device sends uplink control information only on a particular resource and does not need to repeatedly send the uplink control information. If the terminal device has a relatively high reliability requirement, the network device may perform configuration so that the terminal device repeatedly sends the uplink control information on a plurality of resources. For example, uplink control information is repeatedly sent on a resource 1 and a resource 3 shown in FIG. 5, or uplink control information is repeatedly sent on a resource 2 and a resource 4 shown in FIG. 5, and these are both examples of repeated sending in frequency domain.

S22. The network device sends indication information of the uplink control channel to the terminal device, and the terminal device receives the indication information from the network device. The indication information indicates at least one parameter of the following parameters: a time domain length parameter, a frequency domain length parameter, a time domain repeat count parameter, a frequency domain repeat count parameter, and a transmit diversity manner parameter. In an optional solution, the indication information may be used to indicate at least one parameter of the following parameters: a time domain length parameter, a frequency domain length parameter, a time domain repeat count parameter, a frequency domain repeat count parameter, a power parameter, a transmit diversity manner parameter, a time domain resource parameter, a frequency domain resource parameter, and a sequence resource parameter.

To be specific, the network device generates the indication information after configuring the uplink control channel. The indication information is a configuration result of the network device. The network device sends the indication information to the terminal device for the terminal device to determine a configuration of the uplink control channel. For example, the network device may send the indication information to the terminal device by using downlink control information (downlink control information, DCI). Certainly, a manner in which the network device sends the indication information is not limited in this embodiment of this application.

In an example, if the network device configures first-format information for the terminal device, the indication information may include the first-format information, and the first-format information includes the at least one parameter as described previously. In this case, the network device may further notify the terminal device of a plurality of pieces of configured format information in advance, and before the sending, by the network device, indication information of the uplink control channel to the terminal device, the network device may send radio resource control (RRC) signaling or a media access control (MAC) control element (MCE) to the terminal device. The RRC signaling or the MCE includes the plurality of pieces of format information configured by the network device. It can be learned from the foregoing description that, among the plurality of pieces of format information, a value of at least one parameter in one format information is different from a value of at least one parameter in another format information, and different pieces of format information are formed in this way.

The network device may notify the terminal device of one or more of the time domain length parameter, the frequency domain length parameter, the time domain repeat count parameter, the frequency domain repeat count parameter, the time domain resource parameter, the frequency domain resource parameter, and the like, to enable the terminal device to correspondingly determine values of the rest parameters. In other words, the network device does not need to notify the terminal device of excessive parameters in the indication information, so that transmission resources can be further saved. For example, format information 1 of the plurality of pieces of format information occupies two symbols when there is no repeated transmission. In this case, the network device uses the indication information to instruct the terminal device to send uplink control information having a length of four symbols, that is, it is indicated in the indication information that a value of the time domain length parameter is 4. In this way, the terminal device may determine that a time domain repeat count for sending the uplink control information is 2. Certainly, the premise is that the network device uses RRC signaling or an MCE to notify the terminal device of the plurality of pieces of format information and also instruct the terminal device to select the format information 1 from the plurality of pieces of format information. In this case, the format information 1 is repeated twice in time domain and is understood as the first-format information. Otherwise, the network device notifies the terminal device that the time domain repeat count for sending the uplink control information is 2. In this case, the terminal device may determine that the uplink control information having a length of four symbols needs to be sent.

In another example, if the network device configures a second format and M parameters for the terminal device, the indication information may be used to indicate the M parameters, for example, used to indicate the time domain repeat count parameter or the frequency domain repeat count parameter. In this case, the network device needs to notify the terminal device of format information (namely, second-format information) of the second format in advance. Before the sending, by the network device, indication information of the uplink control channel to the terminal device, the network device may use signaling such as RRC signaling or an MCE to indicate the second-format information to the terminal device. Alternatively, if the second format is an existing PDCCH format such as a PDCCH format 1a in an LTE system, actually the terminal device already knows the second format. The network device may not need to send the second-format information to the terminal device again, but needs to send resource information that is of the second format and that is indicated by the second-format information to the terminal device. In other words, before the sending, by the network device, indication information of the uplink control channel to the terminal device, the network device may indicate the resource information of the second format to the terminal device by using signaling such as RRC signaling or an MCE. The resource information of the second format may include a resource location of the second format. Alternatively, it is understood that the resource information of the second format includes second-format information about a time resource and/or frequency resource occupied by a PUCCH. A same format may correspond to a plurality of resources. Therefore, if the resource information of the second format includes only one PUCCH resource, the terminal device may determine the resource location of the second format based on the resource information of the second format. If the resource information of the second format includes a plurality of different PUCCH resources, the network device may further use dynamic signaling (for example, DCI) to notify the terminal device of a particular PUCCH resource to be selected for transmission.

Figure 4:
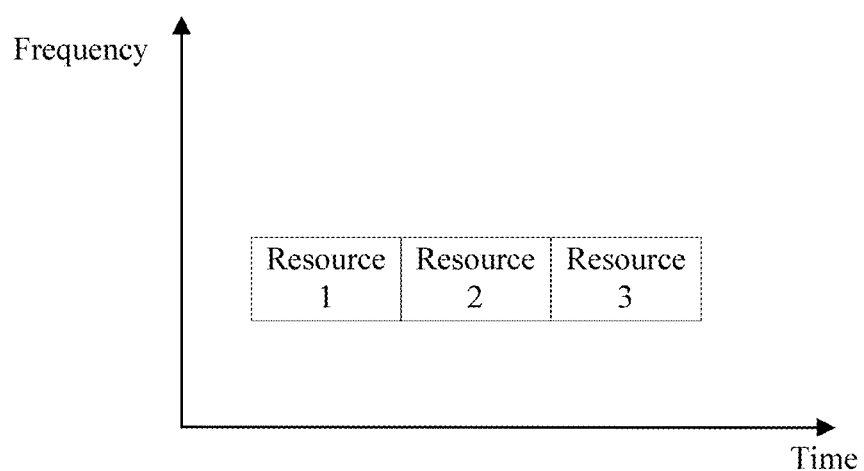
FIG. 4 is a schematic diagram of repeatedly transmitting uplink control information in time domain according to an embodiment of this application.

If the network device configures the uplink control channel in Manner 2 and the M parameters include the time domain repeat count parameter, a value of the time domain repeat count parameter and a location of a start time domain resource may be used to determine a time domain repeat count corresponding to the second format and a corresponding time domain location. The location of the start time domain resource may be indicated by the resource information of the second format. As shown in FIG. 4, the network device preconfigures the resource information of the second format for the terminal device, as shown by a resource 1 in the figure. When actually the terminal device needs to send the uplink control information, the network device notifies the terminal device of a time domain repeat count, for example, 3, according to a reliability requirement that the terminal device needs to satisfy. Then the terminal device sends the uplink control information twice sequentially on a resource 2 and a resource 3 in time domain by using the resource 1 as a start point. Generally, considering sending latency of the uplink control information, the time domain repeat count is consecutive or may be nonconsecutive. This is not limited herein. In FIG. 4, that the repeat count is consecutive in time domain is used as an example.

Alternatively, if the network device configures the uplink control channel in Manner 2 and the M parameters include the frequency domain repeat count parameter, the network device needs to send a value of the frequency domain repeat count parameter to the terminal device by using indication information. Several optional notification manners are described below.

A. Indication in a Bitmap Form

The network device sequentially numbers pre-allocated resource blocks, and "0" or "1" in a bitmap indicates whether a resource block is used for information transmission. For example, FIG. 5 shows four resource blocks pre-allocated by the network device, and the indication information may use a four-bit bitmap for indication. If the bitmap indicates 0101, it represents that a resource 2 and a resource 4 are used to send the uplink control information; or if the bitmap indicates 0001, it represents that a resource 4 is used to send the uplink control information. Such an indication manner is relatively intuitive.

B. Indication by Using the Value of the Frequency Domain Repeat Count Parameter

The network device establishes a correspondence between the value of the frequency domain repeat count parameter and a resource in advance. For example, if the value of the frequency domain repeat count parameter is 2, correspondingly a resource 1 and a resource 3 are used for sending. If the value of the frequency domain repeat count parameter is 1, correspondingly a resource 2 is used for sending. The network device may send the correspondence to the terminal device in advance. The network device only needs to send the value of the frequency domain repeat count parameter to the terminal device in the indication information. After receiving the value of the frequency domain repeat count parameter, the terminal device may determine, based on the correspondence, which resource is used for sending.

In an example, the network device pre-allocates consecutive frequency domain resources. For example, arrangement starts with a resource block 1 for different repeat counts. In this case, when the value of the frequency domain repeat count parameter is 1, it represents that six consecutive physical resource blocks (PRB) starting from the resource block 1 are occupied. When the value of the frequency domain repeat count parameter is 2, it represents that 12 consecutive PRBs starting from the resource block 1 are occupied. The rest is deduced by analogy.

C. Indication by the Frequency Domain Repeat Count Parameter and a Location of a Start Frequency Domain Resource.

The network device establishes a correspondence between the value of the frequency domain repeat count parameter, a location of a start frequency domain resource, and a resource in advance. For example, when the value of the frequency domain repeat count parameter is 2, a corresponding state is a resource at a location of a start frequency domain resource plus a resource whose sequence number is at an interval of 1 from a sequence number of the start frequency domain resource. For example, a start resource is 1, and correspondingly a resource 1 and a resource 3 are used for sending (where sequence numbers of the resource 1 and the resource 3 are at an interval of 1 from each other). Alternatively, for example, when the value of the frequency domain repeat count parameter is 2, a corresponding state is a resource whose location number equals a location number of a start frequency domain resource plus 1 and a resource whose sequence number is at an interval of 2 from the sequence number of the resource. For example, a start resource is 1, and correspondingly a resource 2 and a resource 4 are used for sending (where a sequence number of the resource 2 is a sequence number of the resource at the location of the start frequency domain resource plus 1, and sequence numbers of the resource 4 and resource 2 are at an interval of 2 from each other). The network device may send the correspondence to the terminal device in advance. The network device only needs to send the value of the frequency domain repeat count parameter to the terminal device in the indication information. After receiving the value of the frequency domain repeat count parameter, the terminal device may determine, based on the correspondence, which resource is used for sending.

The indication manners described above are applicable to a case in which the network device pre-allocates nonconsecutive frequency domain resources, and are also applicable to a case in which the network device pre-allocates consecutive frequency domain resources. For the case in which the network device pre-allocates consecutive frequency domain resources, the network device may use an indication manner described below other than any of the foregoing manners for indication.

D. Indication by a Length of a Resource Block.

If the network device pre-allocates consecutive frequency domain resources, the network device may alternatively use a resource block length for indication. For example, arrangement starts with a resource block 1 for different repeat counts. When a resource block length is 1, it represents that the resource block 1 is occupied. When the resource block length is 2, it represents that two consecutive PRBs starting with the resource block 1 are occupied. The rest is deduced by analogy.

In addition, if the network device configures the uplink control channel in Manner 1, and if the first-format information includes the frequency domain repeat count parameter, it is equivalent to that the frequency domain repeat count parameter is bound to a format. Provided that the network device indicates a location of a start frequency domain resource to the terminal device, the terminal device may determine the value of the frequency domain repeat count parameter based on the first-format information, so that the terminal device may determine locations of all frequency domain resources occupied by the uplink control channel.

S23. The terminal device sends the uplink control information to the network device according to the indication information by using the uplink control channel, and the network device receives the uplink control information from the terminal device according to the indication information by using the uplink control channel.

For example, the indication information indicates first-format information and the first-format information includes the value of the frequency domain repeat count parameter, or the indication information indicates M parameters and the M parameters include the frequency domain repeat count parameter. The terminal device may send, at the frequency domain location indicated by the frequency domain repeat count parameter, the uplink control information on the uplink control channel based on the frequency domain repeat count indicated by the frequency domain repeat count parameter. Similarly, the network device receives, at the frequency domain location indicated by the frequency domain repeat count parameter, the uplink control information on the uplink control channel based on the frequency domain repeat count indicated by the frequency domain repeat count parameter.

Alternatively, for example, the indication information indicates first-format information, and the first-format information includes the value of the time domain repeat count parameter, or the indication information indicates M parameters and the M parameters include the time domain repeat count parameter. The terminal device may send, at the time domain location indicated by the time domain repeat count parameter, the uplink control information to the network device on the uplink control channel based on the time domain repeat count indicated by the time domain repeat count parameter. Similarly, the network device receives, at the time domain location indicated by the time domain repeat count parameter and on the uplink control channel based on the time domain repeat count indicated by the time domain repeat count parameter, the uplink control information sent by the terminal device.

For example, the indication information indicates first-format information and the first-format information includes the value of the power parameter, or the indication information indicates M parameters and the M parameters include the power parameter. The terminal device may send the uplink control information to the network device on the uplink control channel based on an uplink transmit power indicated by the power parameter. Similarly, the network device receives, on the uplink control channel based on the uplink transmit power indicated by the power parameter, the uplink control information sent by the terminal device.

Furthermore, in addition to the foregoing method in which the network device notifies the terminal device of a configuration of the uplink control channel by using the indication information, the network device may alternatively choose to notify the terminal device of the configuration of the uplink control channel in an implicit manner. It is described in the background of this application that reliability of an uplink control channel and reliability of a downlink channel may be interchanged. Therefore, the network device and the terminal device may agree in advance a rule for reliability interchange between an uplink control channel and a downlink channel. The terminal device may determine reliability of a downlink channel based on a repeat count of the downlink channel. In this way, the terminal device may correspondingly determine a reliability requirement of an uplink control channel or a time domain repeat count or a frequency domain repeat count of an uplink control channel according to the pre-agreed reliability interchange rule. If the network device configures a plurality of pieces of format information for the terminal device, different pieces of format information may correspond to different reliability requirements or time domain repeat counts or frequency domain repeat counts, and the terminal device may determine the first-format information. Alternatively, if the network device preconfigures the fixed second-format information, the terminal device determines the configuration of the uplink control channel after determining the reliability requirement of the uplink control channel or the time domain repeat count or the frequency domain repeat count of the uplink control channel. In this way, the network device does not need to use additional signaling to notify the terminal device of a related sending parameter of the uplink control channel, thereby reducing signaling overheads.

In this embodiment of this application, the network device may configure an uplink control channel based on factors such as a coverage case and a reliability requirement, so that the configured uplink control channel better satisfies a requirement of a scenario. In addition, the configuration manner is relatively flexible and is easy to implement.

The following describes apparatuses provided in the embodiments of this application with reference to the accompanying drawings.

Figure 6:
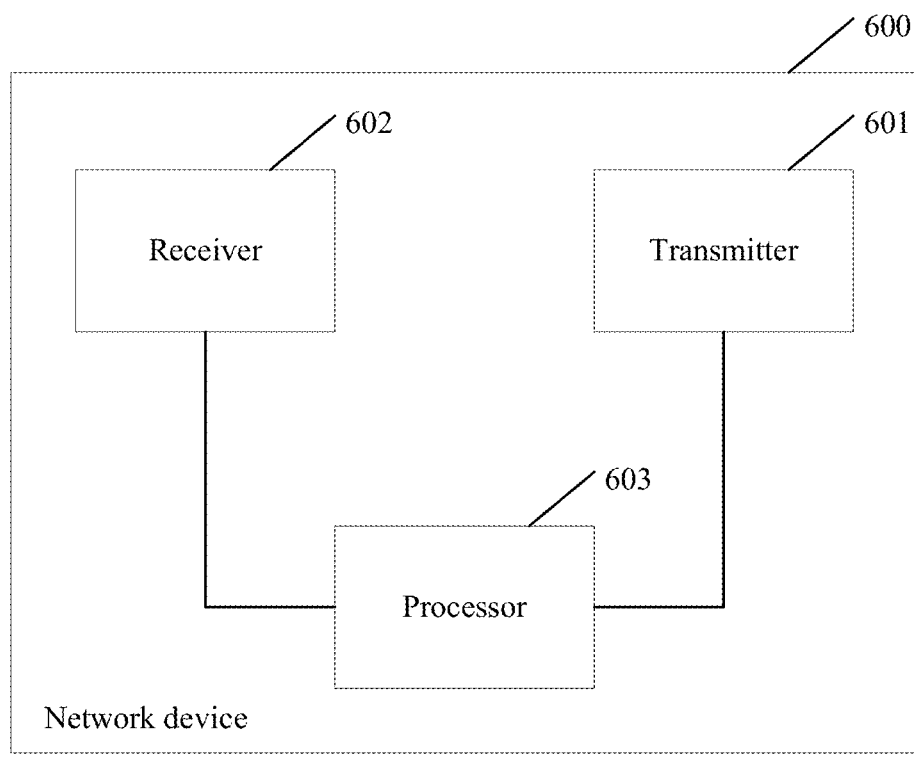
FIG. 6 is a schematic structural diagram of a network device according to an embodiment of this application.

FIG. 6 is a schematic structural diagram of a network device 600. The network device 600 can implement the functions of the foregoing network device. The network device 600 may include a transmitter 601 and a receiver 602. The transmitter 601 may be configured to perform S22 in the embodiment shown in FIG. 2 and/or configured to support another process of the technologies described in this specification. The receiver 602 may be configured to perform S23 in the embodiment shown in FIG. 2 and/or configured to support another process of the technologies described in this specification. Optionally, the network device 600 may further include a processor 603. The processor 603 may be configured to perform S21 in the embodiment shown in FIG. 2; may be configured to generate the indication information, the RRC signaling, the MCE, or the like; may be further configured to preconfigure the plurality of pieces of format information, the second-format information or the like; and/or may be configured to support another process of the technologies described in this specification. For all related content of the steps in the foregoing method embodiment, refer to description of functions of corresponding function modules. Details are not described herein again.

Figure 7:
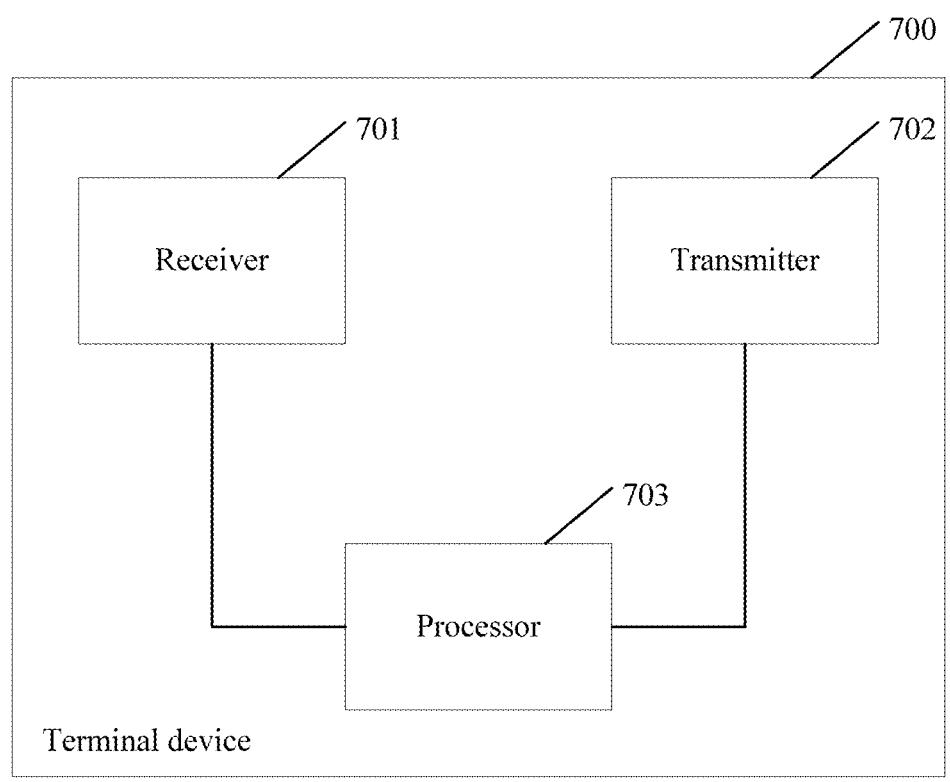
FIG. 7 is a schematic structural diagram of a terminal device according to an embodiment of this application.

FIG. 7 is a schematic structural diagram of a terminal device 700. The terminal device 700 can implement the functions of the foregoing terminal device. The terminal device 700 may include a receiver 701 and a transmitter 702. The receiver 701 may be configured to perform S22 in the embodiment shown in FIG. 2 and/or configured to support another process of the technologies described in this specification. The transmitter 702 may be configured to perform S23 in the embodiment shown in FIG. 2 and/or configured to support another process of the technologies described in this specification. Optionally, the terminal device 700 may further include a processor 703, configured to determine the first-format information according to the indication information, or determine the second-format information and the M parameters according to the indication information, that is, determine the configuration of the uplink control channel according to the indication information, and/or configured to support another process of the technologies described in this specification. For all related content of the steps in the foregoing method embodiment, refer to description of functions of corresponding function modules. Details are not described herein again.

In the embodiments of this application, the network device 600 and the terminal device 700 are presented in a form of dividing various function modules corresponding to various functions, or may be presented in a form of dividing various function modules in an integrated manner. The "module" herein may refer to an application-specific integrated circuit (ASIC), a processor that executes one or more software or firmware programs, a memory, an integrated logic circuit, and/or another component capable of providing the foregoing functions.

Figure 8:
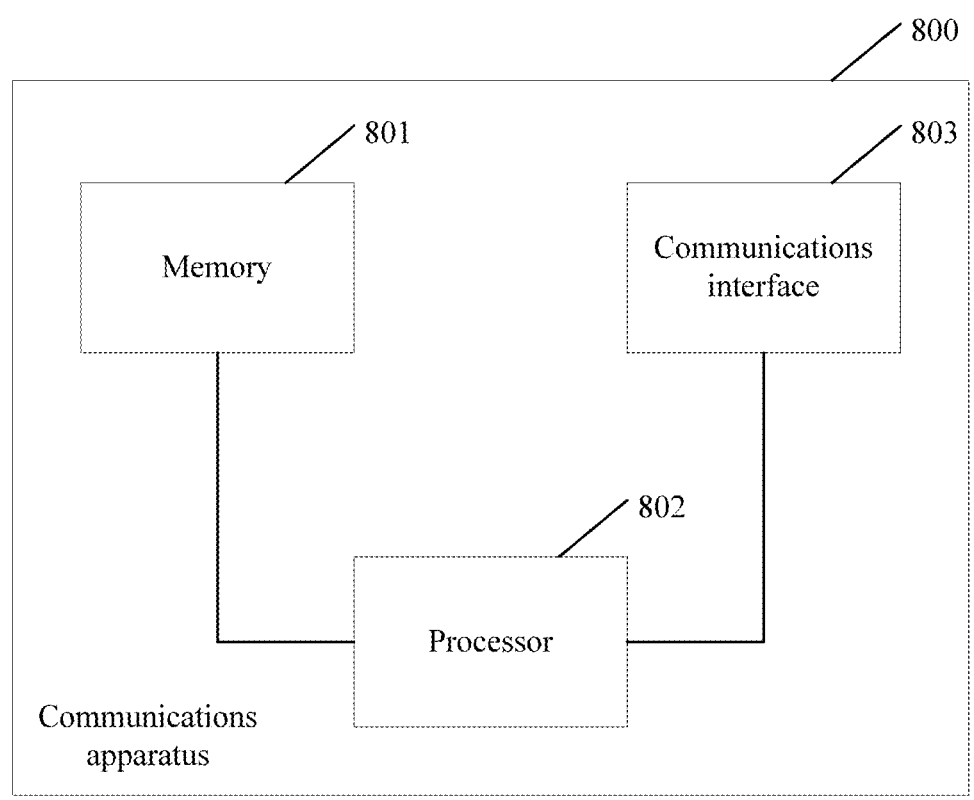
FIG. 8 is a schematic diagram of a communications apparatus according to an embodiment of this application.

In a simple embodiment, persons skilled in the art may consider that the network device 600 or the terminal device 700 may be implemented by using a structure of a communications apparatus 800 shown in FIG. 8.

As shown in FIG. 8, the communications apparatus 800 may include a memory 801, a processor 802, and a communications interface 803. The memory 801 and the communications interface 803 are connected to the processor 802. The memory 801 is configured to store a computer executable instruction. When the communications apparatus 800 is run, the processor 802 executes the computer executable instruction stored in the memory 801, so that the communications apparatus 800 performs the method provided in the embodiment shown in FIG. 2. For details about the method, refer to the foregoing related description and related description of the accompanying drawings. Details are not described herein again. The communications interface 803 may be implemented by using a transceiver or implemented by using a receiver and a transmitter that are independent of each other.

In an example, the transmitter 601 and the receiver 602 may correspond to the communications interface 803 in FIG. 8. The processor 603 may be embedded in or independent of the memory 801 of the communications apparatus 800 in a hardware/software form.

In an example, the receiver 701 and the transmitter 702 may correspond to the communications interface 803 in FIG. 8. The processor 703 may be embedded in or independent of the memory 801 of the communications apparatus 800 in a hardware/software form.

Optionally, the communications apparatus 800 may be a field-programmable gate array (FPGA), an application-specific integrated circuit (ASIC), a system on chip (SoC), a central processing unit (CPU), a network processor (NP), a digital signal processor (DSP), a microcontroller unit (MCU), a programmable logic device (PLD), or another integrated chip. Alternatively, the communications apparatus 800 may be a separate network element, and is, for example, the terminal device or the network device as described previously.

In addition, the network device provided in the embodiment shown in FIG. 6 may be implemented in another form. For example, the network device includes a sending unit and a receiving unit. Optionally, the network device may further include a processing unit. The sending unit may be configured to perform S22 in the embodiment shown in FIG. 2 and/or configured to support another process of the technologies described in this specification. The receiving unit may be configured to perform S23 in the embodiment shown in FIG. 2 and/or configured to support another process of the technologies described in this specification. The processing unit may be configured to perform S21 in the embodiment shown in FIG. 2; may be configured to generate the indication information, the RRC signaling, the MCE, or the like; may be further configured to preconfigure the plurality of pieces of format information, the second-format information or the like; and/or may be configured to support another process of the technologies described in this specification. For all related content of the steps in the foregoing method embodiment, refer to description of functions of corresponding function modules. Details are not described herein again.

In addition, the terminal device provided in the embodiment shown in FIG. 7 may be implemented in another form. For example, the terminal device includes a receiving unit and a sending unit. Optionally, the terminal device may further include a processing unit. The receiving unit may be configured to perform S22 in the embodiment shown in FIG. 2 and/or configured to support another process of the technologies described in this specification. The sending unit may be configured to perform S23 in the embodiment shown in FIG. 2 and/or configured to support another process of the technologies described in this specification. The processing unit is configured to determine the first-format information according to the indication information, or determine the second-format information and the M parameters according to the indication information, that is, determine the configuration of the uplink control channel according to the indication information; and/or configured to support another process of the technologies described in this specification. For all related content of the steps in the foregoing method embodiment, refer to description of functions of corresponding function modules. Details are not described herein again.

The network device 600, the terminal device 700, and the communications apparatus 800 provided in the embodiments of this application may be configured to perform the methods provided in the embodiment shown in FIG. 2. Therefore, for technical effects that can be achieved by the network device 600, the terminal device 700, and the communications apparatus 800, refer to the foregoing method embodiment. Details are not described herein again.

The embodiments of this application are described with reference to the flowcharts and/or block diagrams of the methods, the devices (systems), and the computer program products according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments each may be implemented completely or partially in a form of a computer program product. The computer program product includes one or more computer instructions. When the computer program instruction is loaded and executed on a computer, some or all of the processes or functions according to the embodiments of this application are generated. The computer may be a general purpose computer, a dedicated computer, a computer network, or another programmable apparatus. The computer instruction may be stored in a computer readable storage medium or may be transmitted from a computer readable storage medium to another readable storage medium. For example, the computer instruction may be transmitted from a web site, computer, server, or data center to another web site, computer, server or data center in a wired (for example, a coaxial cable, an optical fiber, or a digital subscriber line (DSL)) or wirelessly (for example, infrared, radio, or microwave). The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Obviously, persons skilled in the art may make various modifications and variations to the embodiments of this application without departing from the spirit and scope of this application. This application is intended to cover these modifications and variations provided that they fall within the scope of protection defined by the following claims and their equivalent technologies.

What is claimed is:

1. A method carried out on a terminal device, the method comprising:
    receiving indication information of an uplink control channel from a network device, wherein the indication information indicates information of a first format of the uplink control channel, and the information of the first format comprises:
        a time domain length,
        a time domain repeat count, and
        a power parameter; and
    sending, using the uplink control channel and according to the indication information, uplink control information to the network device.

2. The method according to claim 1, the method further comprising:
    receiving a radio resource control (RRC) signaling or a media access control (MAC) control element (MCE) from the network device before receiving the indication information from the network device,
    wherein the RRC signaling or the MCE comprises information of a plurality of uplink control channel formats,
    wherein the plurality of uplink control channel formats comprises the first format and a second format, and
    wherein a value of at least one parameter for the first format is different from a value of the at least one parameter for the second format.

3. The method according to claim 2, wherein a value of the time domain repeat count parameter and a location of a start time domain resource are used to determine a time domain repeat count corresponding to the second format and a corresponding time domain location, and
    wherein the location of the start time domain resource is obtained by using the resource information of the second format.

4. The method according to claim 2, wherein the method further comprises:
    determining a format information for sending the uplink control information among the plurality of uplink control channel format information indicated by the RRC signaling or the MCE.

5. The method according to claim 2, wherein the first format is physical uplink control channel (PUCCH) format 1, and the second format is PUCCH format 2.

6. The method according to claim 1, wherein a value of the time domain length equals a quantity of time domain resources, and
    wherein a time domain resource is a resource taken from the group consisting of: a symbol, a slot, and a subframe.

7. The method according to claim 1, wherein the indication information of the uplink control channel is carried in downlink control information (DCI).

8. The method according to claim 1, wherein the information of the first format further comprises at least one of the group consisting of: a frequency domain length parameter, a frequency domain repeat count parameter, a transmit diversity manner parameter, a time domain resource parameter, a frequency domain resource parameter, and a sequence resource parameter,
    wherein a value of the frequency domain length equals a quantity of frequency domain resources, and
    wherein a frequency domain resource is a physical resource block (PRB) or a resource block group (RBG).

9. An apparatus, comprising:
    a processor; and
    a non-transitory computer-readable medium including computer-executable instructions that, when executed by the processor, cause the apparatus to carry out a method including:
    receiving indication information of an uplink control channel from a network device, wherein the indication information indicates information of a first format of the uplink control channel, and the information of the first format comprises:
        a time domain length,
        a time domain repeat count, and
        a power parameter;
    and
    sending, using the uplink control channel and according to the indication information, uplink control information to the network device.

10. The apparatus according to claim 9, wherein the method further comprises:
    receiving a radio resource control (RRC) signaling or a media access control (MAC) control element (MCE)

from the network device before receiving the indication information of the uplink control channel from the network device, wherein the RRC signaling or the MCE comprises information of a plurality of uplink control channel formats, wherein the plurality of uplink control channel formats comprises the first format and a second format, and wherein a value of at least one parameter for the first format is different from a value of at least one parameter for the second format.

11. The apparatus according to claim 10, the method carried out by the apparatus further comprises:

determining a format information for sending the uplink control information among the plurality of uplink control channel format information indicated by the RRC signaling or the MCE.

12. The apparatus according to claim 9, wherein a value of the time domain length equals to a quantity of time domain resources, and a time domain resource is a symbol, or a slot, or a subframe.

13. The apparatus according to claim 9, wherein the indication information of the uplink control channel is carried in downlink control information (DCI).

14. The apparatus according to claim 9, wherein the information of the first format further comprises at least one of the group consisting of: a frequency domain length parameter, a frequency domain repeat count parameter, a transmit diversity manner parameter, a time domain resource parameter, a frequency domain resource parameter, and a sequence resource parameter, wherein a value of the frequency domain length equals a quantity of frequency domain resources, and wherein a frequency domain resource is a physical resource block (PRB) or a resource block group (RBG).

15. An apparatus, comprising:

a processor; and a non-transitory computer-readable medium including computer-executable instructions that, when executed by the processor, cause the apparatus to carry out a method including:

sending indication information of an uplink control channel to a terminal device, wherein the indication information indicates information of a first format of the uplink control channel, and the information of the first format comprises:

a time domain length, a time domain repeat count, and a power parameter; and receiving, using the uplink control channel, uplink control information sent by the terminal device according to the indication information.

16. The apparatus according to claim 15, wherein the method includes:

sending a radio resource control (RRC) signaling or a media access control (MAC) control element (MCE) to the terminal device before sending the indication information to the terminal device;

wherein the RRC signaling or the MCE comprises information of a plurality of uplink control channel formats, and wherein the plurality of uplink control channel formats comprise the first format and a second format, and wherein a value of at least one parameter for the first format is different from a value of the at least one parameter for the second format.

17. The apparatus according to claim 16, wherein the information of the first format further comprises at least one of the group consisting of:

a frequency domain length parameter, a frequency domain repeat count parameter, a transmit diversity manner parameter, a time domain resource parameter, a frequency domain resource parameter, and a sequence resource parameter; and wherein a value of the frequency domain length equals a quantity of frequency domain resources, and a frequency domain resource is a physical resource block (PRB) or a resource block group (RBG).

18. The apparatus according to claim 15, wherein a value of the time domain length equals a quantity of time domain resources, and wherein a time domain resource is a resource taken from the group consisting of: a symbol, a slot, and a subframe.

19. The apparatus according to claim 15, wherein the indication information of the uplink control channel is carried in downlink control information (DCI).

20. The apparatus according to claim 15, wherein the first format is physical uplink control channel (PUCCH) format 1, and the second format is PUCCH format 2.

* * * * *

UNITED STATES PATENT AND TRADEMARK OFFICE
CERTIFICATE OF CORRECTION

PATENT NO. : 11,395,272 B2  Page 1 of 1
APPLICATION NO. : 16/783157
DATED : July 19, 2022
INVENTOR(S) : Wen et al.

It is certified that error appears in the above-identified patent and that said Letters Patent is hereby corrected as shown below:

On the Title Page

Page 2: Item (56) Other Publications, Column 2, Lines 10-14: "3GPP TS 36.211,V14.3.0,:"3rd Generation Partnership Project ;Technical Specification Group Radio AccessNetwork; Evolved Universal TerrestrialRadio Access (E-UTRA); Physical Channelsand modulation (Rele.a.se 1.4)",Jun. 23, 2017 (June 23, 2017, pp. 8-75,XP051298991." should read -- 3GPP TS 36.211, V14.3.0,: (Release 14)", June 2017, pages 8-75. --.

Signed and Sealed this
Twenty-seventh Day of December, 2022

Katherine Kelly Vidal
*Director of the United States Patent and Trademark Office*